United States Patent Office 3,542,793
Patented Nov. 24, 1970

3,542,793
4-UNSUBSTITUTED-5-AMINO- OR 5-ACYLAMINO-PYRAZOLO[3,4-b]PYRIDINES
Alberto Rossi, Oberwil, and Kurt Eichenberger, Therwil, Switzerland, assignors to Ciba Corporation, New York, N.Y., a corporation of Delaware
No Drawing. Filed Dec. 27, 1966, Ser. No. 604,628
Claims priority, application Switzerland, Jan. 22, 1966, 359/66; Nov. 1, 1966, 15,786/66; Nov. 22, 1966, 16,738/66
Int. Cl. C07d 31/50
U.S. Cl. 260—294.8         18 Claims

ABSTRACT OF THE DISCLOSURE

New compounds of the formula

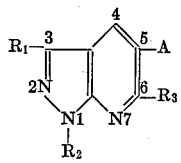

$R_1$–$R_3$=hydrogen, aliphatic, aromatic or araliphatic hydrocarbon,
A=free or acylated amino
For example: 1-isopropyl-3-methyl-5-acetylamino-pyrazolo[3,4-b]pyridine;
Use: hypotensive and vasodilatory agents.

BACKGROUND OF THE INVENTION

The invention concerns new pyrazolo[3,4-b]pyridines, their salts and their preparation, which have not been heretofore disclosed in the literature and which have been found to have valuable hypotensive and vasodilatory properties.

SUMMARY OF THE INVENTION

The present invention relates to 5-A-pyrazolo[3,4-b] pyridines which are unsubstituted in 4-position and in which A represents a free or acylated amino group.

Acylated amino groups are above all those in which the acyl residue is that of carbonic acid or of a derivative thereof or of lower aliphatic carboxylic acids or of araliphatic, aromatic or heterocyclic carboxylic acids. There may be mentioned, for example, carbonic acid monoesters or carbamic acids, for example N-alkyl- or N-acylcarbamic or -thiocarbamic acids, for example those in which the acyl radical is that of a carboxylic acid, such as a lower fatty acid or benzoic acid, or lower fatty acids such as formic, acetic, propionic, butyric or pivalic acid, which may be substituted by hydroxyl or amino groups or by halogen atoms; benzoic acids or phenyl-lower alkanecarboxylic or -lower alkenecarboxylic or pyridinecarboxylic acids whose aromatic rings may be substituted by lower alkyl and/or alkoxy groups and/or halogen atoms and/or trifluoromethyl groups, for example nicotinic or isonicotinic acid. The acetyl radical is preferred.

The amino groups in the above-mentioned acyl radicals are above all primary, secondary or especially tertiary amino groups such as mono- or di-lower alkylamino groups, or lower alkylene-, mono-oxa, mono-aza, or mono-thia-lower alkylene-amino groups such as morpholino, pyrrolidino, piperidino, piperazino or N-lower alkylpiperazino groups: alkyl groups are above all lower alkyl groups such as methyl, ethyl, n-propyl or isopropyl groups: linear or branched butyl or pentyl groups which may be bound in any desired position; alkoxy groups, above all lower alkoxy groups such as lower alkoxy groups corresponding to the above-mentioned lower alkyl groups; halogen atoms are above all chlorine, bromine or fluorine.

The new compounds may also be further substituted, for example in position 1, 3 and/or 6, above all by aliphatic hydrocarbon residues or aromatic or araliphatic residues.

Aliphatic hydrocarbon residues are, for example, saturated or unsaturated aliphatic, alicyclic or alicyclyl-aliphatic hydrocarbon residues, such as lower linear or branched alkyl or alkeny groups, for example methyl, pentyl, hexyl or heptyl groups which may be linked in any desired position; allyl or methallyl residues; cycloalkyl or cycloalkenyl residues such as cyclopentyl, cyclohexyl, cycloheptyl, cyclopentenyl, cyclohexenyl, cycloalkyl- or alkenyl-alkyl residues such as cyclopentyl- or cyclohexenyl-methyl, -ethyl or -propyl groups.

Aromatic residues are above all phenyl residues, araliphatic residues are especially aralkyl or aralkenyl such as phenyl-methyl, -ethyl, -vinyl or -propyl residues. The residues mentioned may be unsubstituted or their aromatic nucleus may carry one, two or more identical or different substituents. Specially suitable substituents are halogen atoms, such as fluorine, chlorine, or bromine atoms, or lower alkyl or alkoxy groups such as methyl, ethyl, propyl or isopropyl; linear or branched butyl or pentyl residues linked in any desired position; methoxy or ethoxy groups, or the different isomeric propoxy, butoxy or pentoxy groups, or trifluoromethyl groups.

The new compounds possess valuable pharmacological properties. Thus, apart from a hypotensive action, they have more especially a vasodilatory action which is particularly pronounced on the coronary vessels as has been shown in animal tests, for example on dogs, cats and guinea pigs. Furthermore, as has been demonstrated, by animal tests, for example on cats and guinea pigs, they have a positive inotropic effect. The new compounds may therefore be used as vasodilators, especially coronary vasodilators, or as cardiotonics. The new compounds are also valuable intermediates for the manufacture of other useful substances, especially of compounds having a pharmacological effect.

DESCRIPTION OF THE PREFERRED EMBODIMENTS

Of special value in this respect are compounds of the formula

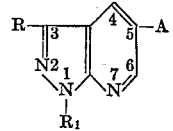

where A has the above meaning and represents above all a free amino group or better still a benzoylamino or lower alkanoylamino group, such as the propionylamino or butyrylamino or especially the acetylamino group; R represents hydrogen or a lower alkyl radical, especially a methyl, ethyl or propyl radical, or an unsubstituted or substituted phenyl radical, and $R_1$ represents a lower, preferably branched, alkyl radical.

Of special value in this group are compounds of the formula

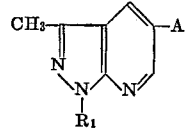

where $R_1$ represents the isopropyl or secondary butyl group and A a free amino group or better still a benzoylamino or lower alkanoylamino group, such as the propionylamino, butyrylamino or especially the acetylamino group—and above all the 1-(secondary butyl)-3-methyl-5-acetylamino-pyrazolo[3,4-b]pyridine of the formula

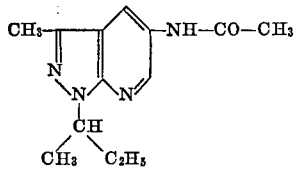

and the 1-isopropyl-3-methyl-5-acetylamino-pyrazolo[3,4-b]pyridine of the formula

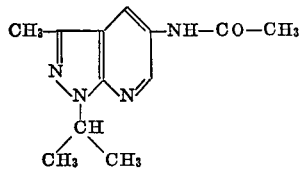

which displays a prounced coronary dilating action when given, for example, intravenously to dogs or cats in a dose of 0.1 to 1 mg. per kg. bodyweight.

The new compounds disclosed in the summary of the invention and the description of the preferred embodiments are obtained by known methods. According to a preferred variant a 5-carbamyl-pyrazolo[3,4-b]pyridine which is unsubstituted in position 4 is subjected to the Hofmann degradation and, if desired, in the resulting compound substituents are eliminated or modified to suit the final products of this invention.

The reactions are carried out in the usual manner, for instance by treatment with an alkaline hypohalite solution, especially sodium hypobromite or hypochlorite solution.

The resulting compounds in which A represents the free amino group can be N-acylated in the usual manner, for example by reaction with an acylating agent, for example with the desired acid, preferably used in the form of a functional derivative thereof, such as one of its halides, especially the chloride, reactive amide such as imidazolide or anhydride, for example inner anhydride such as ketene or enolester, for example isopropenyl acetate, or in the presence of a condensing agent such as dicyclohexyl carbodiimide or similar compounds.

In a resulting compound in which A reprents an N-acylcarbamoyl- or -thiocarbamoylamino group, this group may be hydrolyzed in known manner to yield the free carbamoyl- or thiocarbamoylamino group for example by reaction with an aqueous acidic or alkaline agent, above all an aqueous acid, if desired or required with heating.

In resulting compounds containing, for example in position 1, a residue eliminable by hydrogenolysis, for example the benzyl radical, such a residue can be eliminated in the usual manner, by hydrogenolysis.

In resulting compounds in which the acyl residue is substituted by a group exchangeable for an amino group, such as a reactively esterified hydroxyl group, this group may be exchanged for an amino group, for example by reaction with an amine containing at least one hydrogen atom. Reactively esterified hydroxyl groups are above all hydroxyl groups esterified with a strong organic or inorganic acid, above all with a hydrohalic acid, such as hydrochloric, hydrobromic or hydriodic acid, or with a sulphonic acid such as an arylsulphonic acid, for example para-toluenesulphonic acid.

Any resulting racemic compounds may be separated in the conventional manner into the optical antipodes.

The above-mentioned reactions are carried out in the usual manner in the presence or absence of diluents, condensing agents and/or catalysts, at room temperature or with cooling or especially with heating, if necessary under superatmospheric pressure.

Depending on the reaction conditions and starting materials used the final products are obtained in the free form or in the form of their salts which are likewise included in this invention. The salts of the final products can be converted into the free bases in the known manner, for example with alkalies or ion exchange resins. The free bases yield salts on reaction with organic or inorganic acids, especially those which are suitable for forming therapeutically acceptable salts. As examples of such acids there may be mentioned hydrohalic, sulphuric, phosphoric acids, nitric and perchloric acid; aliphatic, alicyclic, aromatic and heterocyclic carboxylic and sulphonic acids, such as formic, acetic, propionic, succinic, glycollic, lactic, malic, tartaric, citric, ascorbic, maleic, hydroxy-maleic, pyruvic or laevulic acid; phenylacetic, benzoic, para-aminobenzoic, anthranilic, para-hydroxybenzoic, salicylic, para-aminosalicylic acid, methanesulphonic, ethanesulphonic, hydroxyethanesulphonic, ethylenesulphonic acid; halogenzenesulphonic, toluenesulphonic, naphthalenesulphonic and sulphanilic acid; methionine, tryptophan, lysine and arginine.

These and other salts of the new compounds, for example their picrates, may also be used for purifying the resulting free bases by converting them into salts, isolating the salts and liberating the bases again from the salts. In view of the close relationship between the new compounds in the free form and in the form of their salts what has been said above and below with reference to the free bases concerns equally the corresponding salts wherever this is possible and useful.

The invention includes also any variant of the present process in which an intermediate obtained at any stage is used as starting material and any remaining step/steps is/are carried out or the process is discontinued at any stage thereof, or in which a starting material is formed under the reaction conditions or is used in the form of a salt.

The starting materials are new. They are obtained, for example, when a possibly substituted 3-aminopyrazole is reacted with a possibly substituted ethoxymethylene malonic acid ester, closing the 4-hydroxypyridine ring in the resulting condensation product by heating and exchanging in the resulting, possibly substituted, 4-hydroxy-5-carbethoxy [3,4-b]pyridine the hydroxyl group for a halogen atom, for example by reaction with a phosphorus halide, and subjecting the resulting compound to reductive dehalogenation, for example by catalytic hydrogenation. The 4-unsubstituted 5-carbethoxy-pyrazolo[3,4-b]pyridines may then be used for preparing in known manner the corresponding compounds that contain in position 5 the carbamyl group.

The new compounds may be used, for example in the form of pharmaceutical preparations containing them in the free form or in the form of their salts in conjunction or admixture with a pharmaceutical organic or inorganic, solid or liquid excipient suitable for enteral or parenteral administration. Suitable excipients are substances that do not react with the new compounds, for example water, gelatin, lactose, starches, stearyl alcohol, magnesium stearate, talcum, vegetable oils, benzyl alcohols, gums, propyleneglycols, white petroleum jelly or other known medicinal excipients. The pharmaceutical preparations may be, for example, tablets, dragees or capsules, or in liquid form solutions, suspensions or emulsions. They may be sterilized and/or contain auxiliaries, such as preserving, stabilizing, wetting or emulsifying agents, solution promoters, salts for regulating the osmotic pressure or buffers. They may also contain other therapeutically valuable substances. The pharmaceutical preparations are formulated by conventional methods.

The following examples illustrate the invention.

EXAMPLE 1

A solution of 20 g. of sodium hydroxide in 160 ml. of water is cooled to 0° to 5° C. and 5.4 ml. of bromine are dropped in so that the temperature remains below 5° C. Within 30 minutes at 0° to 5° 21.8 g. of 1-isopropyl- 3-methyl-5-carbamyl-pyrazolo[3,4 - b]pyridine are stirred in. The batch is stirred on for 30 minutes at the temperature mentioned, then slowly heated to 60° to 75° C. and the reaction solution is heated for 30 minutes at this temperature, allowed to cool, adjusted with 2 N-hydrochloric acid to pH=6 and repeatedly extracted with ether. The ether residue is dissolved in normal hydrochloric acid, treated with animal charcoal, filtered, the filtrate rendered alkaline with ammonia and extracted with methylenechloride. The residue is distilled under a high vacuum. The fraction which passes over between 150° and 160° C. under 1 mm. Hg pressure solidifies (M.P. 79° to 81° C.); it is the 1-isoproply-3-methyl-5-amino-pyrazolo [3,4-b]pyridine of the formula

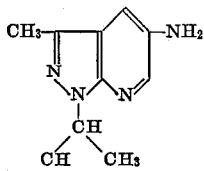

The hydrochloride of the above compound melts at 265° to 270° C. with decomposition.

The 1 - isopropyl - 3 - methyl-5-carbamyl-pyrazolo [3,4-b]pyridine used above as starting material is prepared in the following manner:

A mixture of 151 g. of 1-isopropyl-3-methyl-5-aminopyrazole and 234 g. of ethoxymethylene malonic acid diethyl ester is heated for 30 minutes at 110° C. so that the ethanol formed can distill off. After cooling, petroleum ether is added, the batch is further cooled and yields after filtration N-(1-isopropyl - 3 - methyl - 5-pyrazolyl)aminoethylene malonic acid diethyl ester in the form of faintly brownish crystals melting at 73° to 74° C.

70 grams of this compound are dissolved in 200 ml. of diphenyl ether and refluxed for 7 minutes, then cooled, mixed with ½ litre of ether, extracted with ice-cold 0.5 N-sodium hydroxide solution, treated with animal charcoal, filtered and the filtrate is acidified with glacial acetic acid. The precipitated crystals are suctioned off, washed with water and dried. 53 grams of the resulting 1-isopropyl-3-methyl - 4 - hydroxy-5-carbethoxy-pyrazolo[3,4-b]pyridine (melting at 114° to 116° C.) are mixed with 400 ml. of phosphorus oxychloride and refluxed for 4 hours, then evaporated under vacuum; the residue is mixed with ice, extracted with methylenechloride and washed with icecold 2 N-sodium hydroxide solution and water. The methylenechloride residue is recrystallized from ether+ petroleum ether, to yield 1-isopropyl-3-methyl-4-chloro-5-carbethoxy-pyrazolo[3,4-b]pyridine in the form of colourless crystals melting at 84 to 85° C.

A solution of 40 g. of this chloro compound in ½ litre of absolute ethanol is hydrogenated in the presence of 16 g. of triethylamine and 2 g. of palladium carbon of 20% strength under atmospheric pressure at room temperature until the theoretical amount of hydrogen has been consumed. The batch is filtered, the filtrate evaporated under vacuum, and the residue is taken up in methylenechloride and washed with 2 N-sodium hydroxide solution and water. The methylenechloride residue is recrystallized from petroleum ether, to yield 1-isopropyl-3-methyl-5-carbethoxypyrozolo[3,4-b]pyridine melting at 31° to 32° C.

36 grams of the above ester are dissolved in 300 ml. of ethanol, mixed with 30 ml. of 10 N-sodium hydroxide solution and heated for 2 hours on a water bath. The bulk of ethanol is distilled off under vacuum, and the aqueous alkaline solution is diluted with water and acidified with 2 N-hydrochloric acid. 30 grams of the resulting 1-isopropyl-3-methyl-5-carboxy-pyrazolo[3,4-b]pyridine (melting at 228° to 230° C.) are mixed with 150 ml. of thionylchloride and refluxed for 2 hours, then evaporated under vacuum, and the residue is mixed with toluene and once more evaporated under vacuum. The residue is dissolved in 150 ml. of toluene. While cooling, ammonia gas is introduced until saturation has been reached. The precipitated solid, colourless substance is filtered off, washed with water and recrystallized from aqueous ethanol, to yield 1 - isopropyl-3-methyl-5-carbamyl-pyrazolo[3,4-b]-pyridine meltig at 218° to 220° C.

EXAMPLE 2

A solution of 20 g. of sodium hydroxide in 160 ml. of water is cooled to 0° to 5° C. and mixed dropwise with 5.4 ml. of bromine so that the temperature remains below 5° C. Within 30 minutes at 0° to 5° C. 23.2 g. of 1-(secondary butyl)-3-methyl-5-carbamyl - pyrazolo[3,4-b]-pyridine are stirred in. The reaction solution is kept for 30 minutes at this temperature and then slowly heated to 60° to 75° C. and stirred on for 30 minutes at this temperature, cooled, adjusted with 2 N-hydrochloric acid to pH=6 and repeatedly extracted with ether. The oily ether residue is dissolved in normal hydrochloric acid, treated with animal charcoal, filtered, rendered alyaline with ammonia and extracted with methylenechloride. The residue is distilled under a high vacuum. The oily fraction passing over between 145° and 150° C. under 0.3 mm. Hg pressure is the 1-(secondary butyl)-3-methyl-5-amino-pyrazolo[3,4-b]pyridine of the formula

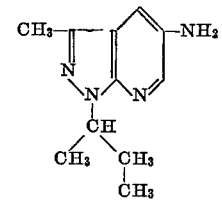

The 1-(secondary butyl)-3-methyl-5-carbamyl-pyrazolo-[3,4-b]pyridine used as starting material is prepared in the following manner:

A mixture of 180 g. of 1-(secondary butyl)-3-methyl-5-aminopyrazole and 282 g. of ethoxymethylene malonic acid diethyl ester is heated for 45 minutes at 130° C. so that the ethanol formed can pass over. The reaction mixture is directly taken up in 700 ml. of diphenyl ether and refluxed for 30 minutes, allowed to cool, mixed with 1 litre of ether and extracted with ice-cold normal sodium hydroxide solution. The alkaline extracts are acidified with glacial acetic acid, the precipitated solid substance is suctioned off and washed with water and dried. Recrystallization from petroleum ether furnishes 1-(secondary butyl)-3-methyl - 4 - hydroxy-5-carbethoxy-pyrazolo[3,4-b]pyridine in the form of colourless crystals melting at 71° to 72° C.

A mixture of 150 g. of this ester and 800 ml. of phosphorus oxychloride is refluxed for 4 hours, then evaporated under vacuum, and the residue is mixed with ice, extracted with methylenechloride, and washed with 2 N-sodium hydroxide solution and water. The methylenechloride residue is recrystallized from pentane, to yield 1-(secondary butyl)-3-methyl-4-chloro - 5 - carbethoxypyrazolo[3,4-b]pyridine in the form of colourless crystals melting at 60° C.

A solution of 100 g. of the above chloro compound in 700 ml. of absolute ethanol is hydrogenated in the presence of 35 g. of triethylamine and 3 g. of palladium carbon of 10% strength under atmospheric pressure at room temperature until the theoretical amount of hydrogen has been consumed. The batch is filtered, evaporated under vacuum, and the residue is taken up in methylenechloride, washed with normal sodium hydroxide solution and water and evaporated under vacuum. The resulting crude, oily 1-(secondary butyl)-3-methyl-5-carbethoxypyrazolo[3,4-b]pyridine is dissolved in 200 ml. of ethanol, mixed with 100 ml. of 10 N-sodium hydroxide solution and heated for 3 hours on a water bath. The bulk of the ethanol is removed under vacuum, and the aqueous alkaline solution is diluted with water and acidified with 2 N-hydrochloric acid. 65 grams of the resulting 1-(secondary butyl-3-methyl-5-carboxy-pyrazolo[3,4-b]pyridine (melting at 150° to 160° C.) are mixed with 300 ml. of thionylchloride and refluxed for 3 hours, evaporated under vacuum, and the residue is mixed with toluene and once more evaporated under vacuum. The residue is dissolved in 300 ml. of toluene. While cooling, ammonia gas is introduced until saturation has been reached. The batch is mixed with petroleum ether, suctioned, and the filter residue is washed with water and dried under vacuum. The resulting 1-(secondary butyl)-3-methyl-5-carbamyl-pyrazolo[3,4-b]pyridine melts at 139° to 141° C.

EXAMPLE 3

A solution of 40 g. of sodium hydroxide in 320 ml. of water is cooled to 0° to 5° C. and mixed dropwise with 10.8 ml. of bromine so that the temperature remains below 5° C. Within 30 minutes 38 g. of 1,3-dimethyl-5-carbamyl-pyrazolo[3,4-b]pyridine are stirred in at the same temperature, then the batch is stirred on for 30 minutes at 0° to 5° C., slowly heated to 60° to 70° C. and the reaction solution is maintained for 1 hour at this temperature, then cooled, acidified with 2 N-hydrochloric acid to pH 6 and repeatedly extracted with ether. The oily residue is taken up in 2 N-hydrochloric acid, treated with animal charcoal, filtered, rendered alkaline with ammonia and extracted with methylenechloride. The residue is distilled under a high vacuum, to yield 1,3-dimethyl-5-amino-pyrazolo[3,4-b]pyridine of the formula

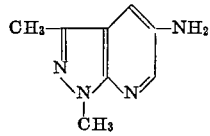

which passes over at 160° C. under 0.5 mm. Hg pressure and melts at 83° to 85° C.

The 1,3-dimethyl-5-carbamyl-pyrazolo[3,4-b]pyridine used as starting material is prepared in the following manner:

A mixture of 82 g. of 1,3-dimethyl-5-aminopyrazole and 16.5 g. of ethoxymethylene malonic acid diethyl ester is heated for 30 minutes at 110° C., then cooled and mixed with petroleum ether, to yield N-(1,3-dimethyl-5-pyrazolyl)-aminomethylene malonic acid diethyl ester melting at 89° to 90° C.

A solution of 108 g. of the above compound in 400 ml. of diphenyl ether is refluxed for 15 minutes, then cooled, diluted with ether, extracted with ice-cold sodium hydroxide solution, and the alkaline aqueous layers are acidified with glacial acetic acid and extracted with methylenechloride. The methylenechloride residue is recrystallized from ethyl acetate+petroleum ether, to yield 1,3 - dimethyl - 4-hydroxy-5-carbethoxy-pyrazolo[3,4-b]pyridine in the form of faintly brownish crystals melting at 108° to 109° C.

A mixture of 50 g. of the above compound and 400 ml. of phosphorus oxychloride is refluxed for 4 hours, then evaporated under vacuum, and the residue is mixed with ice, extracted with methylenechloride and washed with ice-cold 2 N-sodium hydroxide solution and water. The methylenechloride residue is recrystallized from petroleum ether, to yield 1,3-dimethyl-4-chloro-5-carbethoxy-pyrazolo[3,4-b]pyridine melting at 93° to 94° C.

45.4 grams of this chloro compound are dissolved in ½ litre of absolute ethanol and hydrogenated in the presence of 18.2 g. of triethylamine and 1.5 g. of palladium carbon of 10% strength under atmospheric pressure at room temperature until the theoretical amount of hydrogen has been consumed. The batch is filtered, evaporated under vacuum, and the residue is taken up in methylenechloride and washed with normal sodium hydroxide solution and with water. The methylenechloride residue is recrystallized from petroleum ether, to yield 1,3-dimethyl-5-carbethoxy-pyrazolo[3,4-b]pyridine melting at 91° to 92° C.

A solution of 30 g. of this ester in 200 ml. of ethanol is mixed with 20 ml. of 10 N-sodium hydroxide solution and heated for 2 hours on a water bath. The bulk of the ethanol is distilled off under vacuum, and the aqueous alkaline solution is diluted with water and acidified with 2 N-hydrochloric acid. The precipitate is dried, to yield 1,3-dimethyl-5-carboxy-pyrazolo[3,4-b]pyridine melting at 276° to 277° C.

A mixture of 25 g. of the above acid and 150 ml. of thionylchloride is refluxed for 2 hours, then evaporated under vacuum, and the residue is mixed with toluene and once more evaporated. While cooling a solution of this acid chloride in 150 ml. of toluene, ammonia gas is introduced until saturation has been reached. The batch is mixed with petroleum ether, the colourless solid substance is filtered off and rinsed with water, to yield 1,3-dimethyl-5-carbamyl-pyrazolo[3,4-b]pyridine melting at 237 to 239° C.

EXAMPLE 4

A solution of 20 g. of sodium hydroxide in 160 ml. of water is cooled to 0° to 5° C. and mixed dropwise with 5.4 ml. of bromine so that the temperature remains below 5° C. Within 30 minutes, while keeping the reaction temperature below 5° C., 23.8 g. of 1-phenyl-5-carbamyl-pyrazolo[3,4-b]pyridine are stirred in portionwise. The batch is then slowly heated to 60° to 75° C., maintained for 45 minutes at this temperature, then cooled, adjusted with 2 N-hydrochloric acid to pH 6 and extracted with ether. The ethereal solution is treated with animal carbon, filtered and the residue distilled under a high vacuum. 1-phenyl-5-amino-pyrazolo[3,4-b]pyridine of the formula

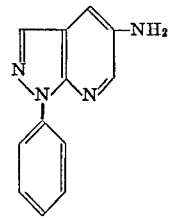

passes over between 195° and 200° C. under 0.1 mm. Hg pressure, solidifies after a short time and melts at 82° to 84° C.

The 1-phenyl-5-carbamyl-pyrazolo[3,4-b]pyridine used above as starting material is prepared in the following manner:

An intimate mixture of 159 g. of 1-phenyl-5-aminopyrazole and 216 g. of ethoxymethylene malonic acid diethyl ester is heated for 30 minutes at 110° C., allowed to cool, and 400 ml. of ethanol and petroleum ether are added until copious crystallization sets in.

A solution of 19 g. of the resulting N-(1-phenyl-5-pyrazolyl)-aminomethylene malonic acid diethyl ester in 180 ml. of diphenyl ether is refluxed for 10 minutes, allowed to cool, mixed with petroleum ether, filtered and recrystallized from methylenechloride+petroleum ether. The resulting 1-phenyl-4-hydroxy-5-carbethoxy-pyrazolo[3,4-b]pyridine forms a faintly brownish substance melting at 148° to 150° C.

A mixture of 30 g. of this compound and 150 ml. of phosphorus oxychloride is refluxed for 4 hours, then evaporated under vacuum, and the residue is taken up in methylenechloride, agitated with ice-cold 2 N-sodium hydroxide solution and water and dried over magnesium sulphate. The residue is recrystallized from ethyl acetate+petroleum ether, to yield 1-phenyl-4-chloro-5-carbethoxy-pyrazolo[3,4-b]pyridine melting at 97° to 99° C.

A solution of 15 g. of this chloro compound in ½ litre of absolute ethanol is hydrogenated in the presence of 5.5 g. of triethylamine and 0.5 g. of palladium carbon of 10% strength under atmospheric pressure at room temperature until the theoretical amount of hydrogen has been absorbed. The batch is filtered, evaporated under vacuum, the residue is taken up in methylenechloride, rinsed with normal sodium hydroxide solution and water and the residue crystallized from methylenechloride+petroleum ether, to yield 1-phenyl-5-carbethoxy-pyrazolo[3,4-b]pyridine melting at 125° to 127° C.

A solution of 10 g. of this ester in 100 ml. of ethanol is mixed with 100 ml. of normal sodium hydroxide solution and heated for 2 hours on a water bath. The bulk of ethanol is distilled off under vacuum, the aqueous alkaline solution filtered, acidified with 2 N-hydrochloric acid and the solid precipitate is suctioned off.

88 grams of the resulting 1-phenyl-5-carboxy-pyrazolo[3,4-b]pyridine (melting at 270° to 271° C.) are mixed with 300 ml. of thionylchloride and refluxed for 3 hours, then evaporated under vacuum, mixed with toluene and once more evaporated. While cooling a solution of the resulting acid chloride in 300 ml. of toluene, ammonia gas is introduced until saturation is reached. The precipitate substance is filtered off, rinsed with water and recrystallized from ethanol, to yield 1-phenyl-5-carbamyl-pyrazolo[3,4-b]pyridine melting at 230° to 231° C.

EXAMPLE 5

A mixture of 7 g. of 1-isopropyl-3-methyl-5-amino-pyrazolo[3,4-b]pyridine and 30 ml. of acetic anhydride is kept for 2 hours at room temperature, then evaporated under vacuum, and the residue is crystallized from ethyl acetate+petroleum ether, to yield 1-isopropyl-3-methyl-5-acetamino-pyrazolo[3,4-b]pyridine of the formula

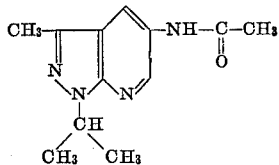

melting at 133° to 135° C.

An analogous reaction with isobutyric anhydride yields 1 - isopropyl - 3 - methyl - 5 - isobutyrylamino - pyrazolo[3,4-b]pyridine of the formula

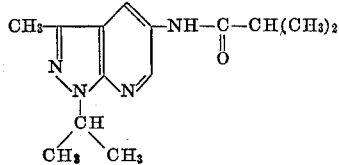

melting at 129° to 130° C.

An analogous reaction with propionic anhydride yields 1 - isopropyl - 3 - methyl - 5 - propionylamino - pyrazolo[3,4-b]pyridine of the formula

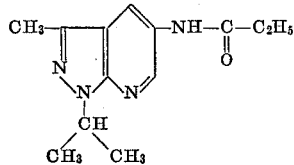

melting at 107° to 108° C.

An analogous reaction with n-butyric anhydride yields 1 - isopropyl - 3 - methyl - 5 - n - butyrylamino - pyrazolo[3,4-b]pyridine of the formula

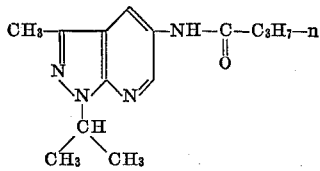

melting at 103° to 104° C.

EXAMPLE 6

A solution of 8 g. of para-chlorobenzoylchloride in 20 ml. of benzene is stirred into a solution of 8 g. of 1-isopropyl-3-methyl-5-amino-pyrazolo[3,4-b]pyridine and 3.5 g. of pyridine in 200 ml. of benzene. The mixture is stirred for 3 hours, then evaporated under vacuum, and the residue is taken up in methylenechloride and agitated with 2 N-hydrochloric acid and then with 2 N-sodium hydroxide solution. The methylenechloride solution is washed with water, dried over magnesium sulphate and evaporated, and the residue recrystallized from ethyl acetate+petroleum ether, to yield 1-isopropyl-3-methyl-5-(para-chlorobenzamido)-pyrazolo[3,4-b]pyridine of the formula

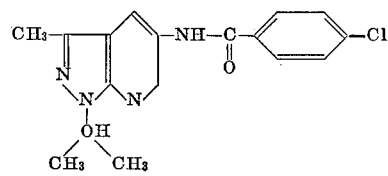

in the form of colourless crystals melting at 197° to 199° C.

A mixture of 10 g. of 1-isopropyl-3-methyl-5-amino-pyrazolo[3,4-b]pyridine, 5 g. of pyridine and 6.8 g. of benzoylchloride reacted in similar manner yields 1-isopropyl-3-methyl-4-benzamido-pyrazolo[3,4-b]pyridine of the formula

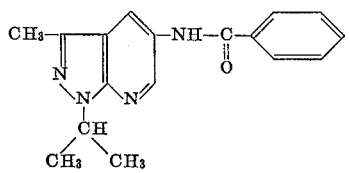

melting at 164° to 165° C.

A mixture of 6 g. of 1-isopropyl-3-methyl-5-amino-pyrazolo[3,4-b]pyridine, 3 g. of pyridine and 8.8 g. of 3,4,5-trimethoxybenzoylchloride reacted in similar manner gives rise to 1-isopropyl-3-methyl-5-(3',4',5'-trimethoxybenzamido)-pyrazolo[3,4-b]pyridine of the formula

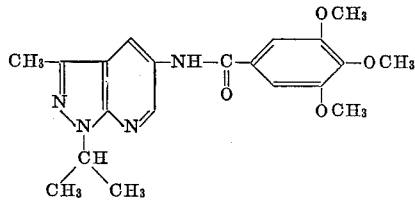

in the form of colourless crystals melting at 194° to 196° C.

EXAMPLE 7

A solution of 10 g. of 1-isopropyl-3-methyl-5-amino-pyrazolo[3,4-b]pyridine and 4.5 g. of pyridine in 50 ml. of absolute dioxan is cooled to 10° C., and a solution of 6.3 g. of chloracetylchloride in 20 ml. of absolute dioxan is stirred in dropwise. The batch is stirred for 3 hours at room temperature, mixed with ice water and the precipitated crystals are filtered off and recrystallized from ethyl acetate+petroleum ether, to yield 1-isopropyl-3-methyl-5-chloroacetamino-pyrazolo[3,4-b]pyridine of the formula

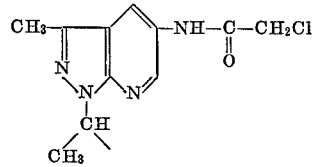

in the form of colourless crystals melting at 136° to 137° C.

An analogous reaction of 10 g. of 1-isopropyl-3-methyl-5-amino-pyrazolo[3,4-b]pyridine, 4.5 g. of pyridine and 8 g. of dichloroacetylchloride gives rise to 1-isopropyl-3-methyl-5-dichloroacetamino-pyrazolo[3,4-b]pyridine of the formula

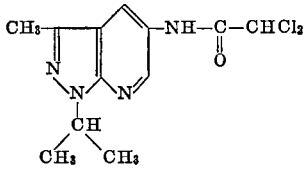

in the form of colourless crystals melting at 149° to 150° C.

EXAMPLE 8

A solution of 11.7 g. of 1-isopropyl-3-methyl-5-chloroacetamino-pyrazolo[3,4-b]pyridine and 7.5 g. of morpholine in 100 ml. of toluene is stirred under reflux for 10 hours, then cooled, extracted with 2 N-hydrochloric acid, and the hydrochloric extracts are rendered alkaline with ice-cold ammonia solution and extracted with ethyl acetate. The ethyl acetate layer is washed with water, dried over magnesium sulphate and evaporated to give a solid residue which on recrystallization from ethyl acetate+petroleum ether yields 1-isopropyl-3-methyl-5-(α-morpholino-acetamino)-pyrazolo[3,4-b]pyridine of the formula

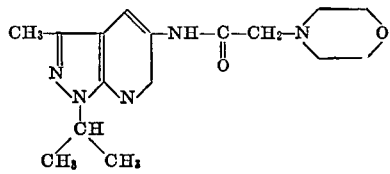

melting at 156° to 157° C.

Its hydrochloride melts and decomposes at 209° to 211° C.

EXAMPLE 9

8 grams of 1-(secondary butyl)-3-methyl-5-amino-pyrazolo[3,4-b]pyridine are mixed with 20 ml. of acetic anhydride, whereupon the mixture heats up. It is kept for 20 minutes at room temperature, evaporated under vacuum, the residue is triturated with water and the resulting crystals are filtered off. On recrystallization from methylenechloride+petroleum there results 1-(secondary butyl)-3-methyl-5-acetamino-pyrazolo[3,4-b]pyridine of the formula

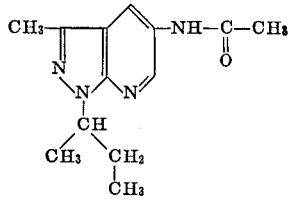

melting at 92° to 94° C.

EXAMPLE 10

A solution of 10 g. of 1-(secondary butyl)-3-methyl-5-amino-pyrazolo[3,4-b]pyridine and 4.5 g. of pyridine in 50 ml. of absolute dioxan is cooled to 10° C. and mixed dropwise, while being stirred, with a solution of dichloroacetylchloride in 20 ml. of absolute dioxan. The batch is stirred on for 3 hours at room temperature, mixed with ice water and the precipitated crystals are filtered off, and recrystallized from ether+petroleum ether, to yield 1-(secondary butyl) - 3 - methyl - 5-dichloroacetamino-pyrazolo [3,4-b]pyridine of the formula

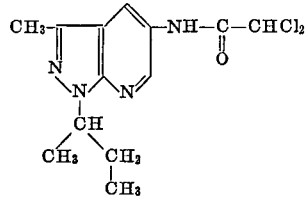

in the form of crystals melting at 108° to 110° C.

EXAMPLE 11

A suspension of 6.15 g. of isonicotinic acid in 125 ml. of methylenechloride is mixed with 5.05 g. of triethylamine, then cooled to 0° to 5° C., and within 20 minutes a solution of 6 g. of chloroformic acid ethyl ester in 10 ml. of methylenechloride is stirred in, making sure that the temperature remains between 0° and 5° C. The batch is stirred on for 30 minutes at this temperature, then a solution of 10.2 g. of 1-(secondary butyl)-3-methyl-5-amino-pyrazolo[3,4-b]pyridine in 20 ml. of methylenechloride is dropped in and the whole is kept overnight, filtered and the filtrate is evaporated. The residue is treated with ethanolic hydrochloric acid and ether, the precipitated hydrochloride filtered off and taken up in water. The undissolved matter is filtered off, and the aqueous filtrate is rendered alkaline with ammonia and extracted with methylenechloride. The oily methylenechloride residue solidifies after some time and is recrystallized from benzene, to yield 1-(secondary butyl)-3-methyl-5-isonicotinoylamino-pyrazolo[3,4-b]pyridine of the formula

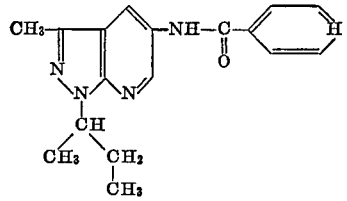

melting at 164° to 166° C.

EXAMPLE 12

A solution of 8.8 g. of 3,4,5-trimethoxybenzoylchloride in 50 ml. of absolute dioxan is stirred dropwise into a solution of 6 g. of 1-(secondary butyl)-3-methyl-5-amino-pyrazolo[3,4-b]pyridine and 3 g. of pyridine in 200 ml. of absolute dioxan. The batch is stirred on for 6 hours at room temperature, mixed with ice water and the precipitated crystals are filtered off and recrystallized from aqueous ethanol, to yield 1-(secondary butyl)-3-methyl-5-(3', 4',5' - trimethoxybenzamido) - pyrazole[3,4-b]pyridine of the formula

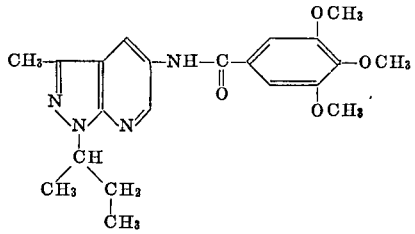

in the form of colourless crystals melting at 176° to 177° C.

EXAMPLE 13

A solution of 2.7 g. of 1,3-dimethyl-5-amino-pyrazolo[3,4-b]pyridine in 10 ml. of acetic anhydride is kept for 2 hours at room temperature, then mixed with ether, and the crystals are filtered off and recrystallized from benzene+petroleum ether, to yield 1,3-dimethyl-5-acetaminopyrazolo[3,4-b]pyridine of the formula

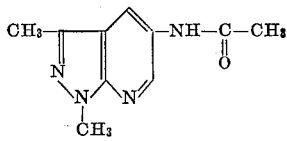

in the form of colourless crystals melting at 152° to 153° C.

EXAMPLE 14

7.4 ml. of bromine are added dropwise with stirring in the course of 15 minutes to a solution of 28 g. of sodium hydroxide solution in 220 ml. of water cooled to 0–5° C. 35.3 g. of 1-methyl-3-phenyl-5-carbamyl-pyrazolo[3,4-b]pyridine are then added in portions so that the temperature remains at 0–5° C. The reaction solution is stirred for 45 minutes at this temperature and then heated in the course of 45 minutes to 75° C. and maintained at that temperature for another 45 minutes. The batch is cooled and allowed to stand for 15 hours, and the precipitated substance is then filtered with suction and recrystallized from ether, to yield 1-methyl-3-phenyl-5-amino-pyrazolo[3,4-b]pyridine of the formula

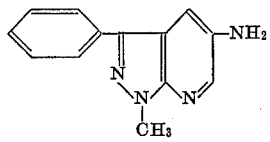

melting at 95–96° C.

The 1-methyl-3-phenyl-5-carbamyl-pyrazolo[3,4-b]pyridine used as starting material may be prepared as follows:

A solution of 80 g. of benzoylacetonitrile and 26 g. of methylhydrazine in 800 ml. of absolute ethanol is boiled under reflux for 10 hours. The reaction mixture is then evaporated in vacuo and the residue recrystallized from a mixture of ethanol and petroleum ether, 1-methyl-3-phenyl-5-amino-pyrazole melting at 130–131° C. being obtained. 50 g. of this substance are heated with 67 g. of ethoxymethylene malonic acid diethyl ester for 30 minutes at 120° C., ethanol distilling off. The batch is cooled, the reaction mass taken up in methylene chloride and treated with petroleum ether. On cooling, crystallization takes place and, after filtration, N-(1-methyl-3-phenyl-pyrozolyl-5)-amino-methylene malonic acid diethyl ester melting at 98–100° C. is obtained. 40 g. of this substance are boiled under reflux for 15 minutes in 150 ml. of diphenyl ether. After cooling, the reaction mixture is treated with petroleum ether and the precipitated solid substance filtered off. By recrystallization from a mixture of ethanol and petroleum ether there is obtained 1-methyl-3-phenyl-4-hydroxy-5-carbethoxy-pyrazolo[3,4-b]pyridine melting at 133–135° C. 81 g. of this substance are boiled under reflux for 4 hours with 500 ml. of phosphorus oxychloride. After the major portion of phosphorus oxychloride has been removed in vacuo, the batch is treated with ice, methylene chloride is added and the reaction solution rendered alkaline by the careful addition of sodium hydroxide solution. The methylene chloride layer is washed with water, dried over magnesium sulphate and evaporated. The residue is recrystallized from a mixture of ethanol and petroleum ether to yield 1-methyl-3-phenyl-4-chloro-5-carbethoxy-pyrazolo[3,4-b]pyridine melting at 130–132° C.

A solution of 76.5 g. of the above compound and 24.9 g. of triethylamine in 2000 ml. of absolute ethanol is hydrogenated in the presence of 3 g. of palladium carbon (10%) at room temperature and under normal pressure. The batch is heated on a water-bath, filtered off from the catalyst with heating and evaporated in vacuo. The solid residue is taken up in methylene chloride, extracted with sodium hydroxide solution and then with water. The methylene chloride solution is evaporated and the residue recrystallized from alcohol to yield 1-methyl-3-phenyl-5-carbethoxy-pyrazolo[3,4-b]pyridine melting at 121–123° C. A solution of 62 g. of this ester in 300 ml. of ethanol is boiled under reflux on a water bath for 2 hours with 50 ml. of 10 N sodium hydroxide solution and 300 ml. of water. The major portion of the ethanol is distilled off, the batch acidified with 2 N aqueous hydrochloric acid and the precipitated solid acid of M.P. 254–255° C. is filtered off. By recrystalization from dimethylformamide the melting point is raised to 259–260° C.

51.5 g. of the so-obtained 1-methyl-3-phenyl-5-carboxy-pyrazolo[3,4-b]pyridine are boiled under reflux for 3 hours with 500 ml. of thionylchloride. The batch is evaporated in vacuo, the residue treated with 250 ml. of toluene and the whole again evaporated. The residue is taken up in 850 ml. of toluene and a current of dry ammonia is introduced with stirring. After the evolution of ammonia has subsided, the precipitated substance and the ammonium chloride are filtered with suction. The reaction mixture is dissolved in 150 ml. of dimethylformamide with heating, treated with 300 ml. of water and the precipitated 1-methyl-3-phenyl-5-carbamyl-pyrazolo[3,4-b]pyridine melting at 232–233° C. filtered.

EXAMPLE 15

5 g. of 1-methyl-3-phenyl-5-amino-pyrazolo[3,4-b]pyridine are treated with 20 ml. of acetic acid anhydride, the substance dissolving with heating. After 20 minutes petroleum ether is added and the precipitated solid substance filtered off. By recrystallization from methylene chloride and petroleum ether there is obtained 1-methyl-3-phenyl-5-acetylamino-pyrazolo[3,4-b]pyridine of the formula

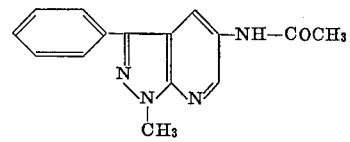

in the form of white crystals melting at 179–180° C.

EXAMPLE 16

14 g. of benzoyl chloride are added dropwise with stirring to 150 ml. of acetone and 8.5 g. of ammonium thiocyanate, and the mixture is boiled for 5 minutes under reflux. After cooling, a solution of 19 g. of 1-isopropyl-3-methyl-5-amino-pyrazolo[3,4-b]pyridine in 50 ml. of acetone is added dropwise to the reaction mixture. The batch is boiled for 20 minutes under reflux, cooled, the solution poured into ice and the precipitated crystals filtered off. Recrystallization from ethanol yields 1 - isopropyl - 3-methyl-5-[N'-benzoyl - thiocarbamoylamino]pyrazolo[3,4-]pyridine of the formula

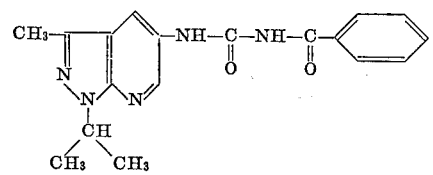

melting at 133–135° C.

EXAMPLE 17

17 g. of 1-isopropyl-3-methyl-5-[N'-benzoyl - thiocarbamoyl]pyrazolo[3,4-b]pyridine are boiled under reflux for 5 minutes with 85 ml. of aqueous sodium hydroxide solution of 10% strength. The reaction mixture is cooled, acidified with concentrated hydrochloric acid to a pH value of 2 and rendered weakly alkaline again with ammonia, abundant crystals precipitating. Recrystallization from ethanol yields 1-isopropyl-3-methyl - 5 - thiocarbamoyl-amino-pyrazolo[3,4-b]pyridine of the formula

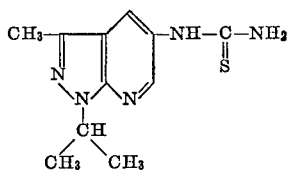

in the form of colourless crystals melting at 198–200° C.

EXAMPLE 18

Tablets containing 25 mg. of active substance are prepared, for example from the following ingredients:

| Ingredients: | Per Tablet, mg. |
|---|---|
| 1-isopropyl-3-methyl-5 - acetamino - pyrazolo [3,4-b]pyridine | 25.0 |
| Lactose | 60.0 |
| Wheat starch | 25.0 |
| Colloidal silicic acid | 7.0 |
| Arrowroot | 15.3 |
| Talc | 7.0 |
| Magnesium stearate | 0.7 |
| | 140.0 |

Method 1-isopropyl-3-methyl-5-acetamino-pyrazolo[3,4 - b]pyridine is mixed with the lactose, part of the wheat starch and with colloidal silicic acid and the mixture passed through a sieve. The remaining wheat starch is pasted with 5 times the quantity of water on a water-bath and the powdery mxture kneaded with this paste and water added, if necessary, until a slightly plastic mass is formed. The plastic mass is passed through a sieve having a mesh of about 3 mm., dried at 45° C. and the dry granulate passed through a sieve having a mesh of 0.8 mm. Arrowroot, talc and magnesium stearate are then mixed in and the resulting mixture compressed into tablets weighing 140 mg.

What is claimed is:
1. A member selected from the group consisting of a compound of the formula

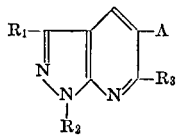

in which $R_1$, $R_2$ and $R_3$ each represents a member selected from the group consisting of hydrogen, lower alkyl, phenyl, phenyl-lower alkyl, and phenyl and phenyl-lower alkyl substituted by at least one member selected from the group consisting of halogen, lower alkyl, lower alkoxy and trifluoromethyl, and A is a member selected from the group consisting of free amino and amino substituted by the acyl residue of carbamic acid, an N-lower alkyl-carbamic acid, an N-lower alkanoyl-carbamic acid, an N-benzoyl-carbamic acid, a thiocarbamic acid, an N-lower alkylthiocarbamic acid, an N-lower alkanoyl-thiocarbamic acid, an N-benzoyl-thiocarbamic acid, a lower fatty acid, a hydroxy-lower fatty acid, a di-lower alkylamino-lower fatty acid, a halogeno-lower fatty acid, benzoic acid, a phenyl-lower alkanecarboxylic acid, a pyridinecarboxylic acid and benzoic and phenyl-lower-alkanecarboxylic acids which carry in the aromatic rings at least one member selected from the group consisting of lower alkyl, lower alkoxy, halogen and trifluoromethyl, and a therapeutically acceptable acid addition salt thereof.

2. A compound as claimed in claim 1, said compound being a member selected from the group consisting of a compound of the formula

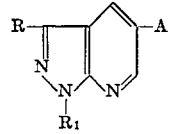

in which A stands for a member selected from the group consisting of free amino, benzoylamino, benzoylamino which is substituted by at least one member selected from the group consisting of lower alkyl, lower alkoxy, halogen and trifluoromethyl and lower alkanoylamino, R represents a member selected from the group consisting of hydrogen, lower alkyl, phenyl and phenyl substituted by at least one member selected from the group consisting of lower alkyl, lower alkoxy, halogen and trifluoromethyl and $R_1$ stands for lower alkyl and a therapeutically acceptable acid addition salt thereof.

3. A compound as claimed in claim 1, said compound being a member selected from the group consisting of a compound of the formula

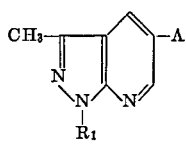

in which $R_1$ stands for isopropyl or secondary butyl and A for a member selected from the group consisting of free amino, benzoylamino, benzoylamino substituted by at least one member selected from the group consisting of lower alkyl, lower alkoxy, halogen and trifluoromethyl, and lower alkanoylamino, and a therapeutically acceptable acid addition salt thereof.

4. A compound as claimed in claim 1, said compound being a member selected from the group consisting of a compound of the formula

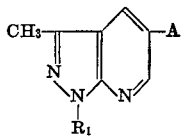

in which $R_1$ stands for isopropyl or secondary butyl and A for a member selected from the group consisting of free amino, propionylamino, butyrylamino and acetyl-amino, and a therapeutically acceptable acid addition salt thereof.

5. A compound as claimed in claim 1, said compound being a member selected from the group consisting of the 1 - (secondary butyl) - 3 - methyl - 5 - acetylamino - pyrazolo[3,4-b] pyridine and a therapeutically acceptable acid addition salt thereof.

6. A compound as claimed in claim 1, said compound being a member selected from the group consisting of the 1 - isopropyl - 3 - methyl - 5 - acetylamino - pyrazolo [3,4-b]pyridine and a therapeutically acceptable acid addition salt thereof.

7. A compound as claimed in claim 1, said compound being a member selected from the group consisting of the 1 - isopropyl - 3 - methyl - 5 - amino - pyrazolo[3,4-b] pyridine and a therapeutically acceptable acid addition salt thereof.

8. A compound as claimed in claim 1, said compound being a member selected from the group consisting of the 1 - (secondary butyl) - 3 - methyl - 5 - amino - pyrazolo [3,4-b]pyridine and a therapeutically acceptable acid addition salt thereof.

9. A compound as claimed in claim 1, said compound being a member selected from the group consisting of the 1,3 - dimethyl - 5 - amino - pyrazolo[3,4-b]pyridine and a therapeutically acceptable acid addition salt thereof.

10. A compound as claimed in claim 1, said compound being a member selected from the group consisting of the 1 - phenyl - 5 - amino - pyrazolo[3,4-b]pyridine and a therapeutically acceptable acid addition salt thereof.

11. A compound as claimed in claim 1, said compound being a member selected from the group consisting of the 1 - isopropyl - 3 - methyl - 5 - isobutyrylamino - pyrazolo [3,4-b]pyridine and a therapeutically acceptable acid addition salt thereof.

12. A compound as claimed in claim 1, said compound being a member selected from the group consisting of the 1 - isopropyl - 3 - methyl - 5 - propionylamino - pyrazolo [3,4-b]pyridine and a therapeutically acceptable acid addition salt thereof.

13. A compound as claimed in claim 1, said compound being a member selected from the group consisting of the 1 - isopropyl - 3 - methyl - 5 - n - butyrylamino - pyrazolo [3,4-b]pyridine and a therapeutically acceptable acid addition salt thereof.

14. A compound as claimed in claim 1, said compound being a member selected from the group consisting of the 1 - isopropyl - 3 - methyl - 5 - (para - chlorobenzamido)- pyrazolo[3,4-b]pyridine and a therapeutically acceptable acid addition salt thereof.

15. A compound as claimed in claim 1, said compound being a member selected from the group consisting of the 1 - isopropyl - 3 - methyl - 5 - benzamido - pyrazolo[3,4-b]pyridine and a therapeutically acceptable acid addition salt thereof.

16. A compound as claimed in claim 1, said compound being a member selected from the group consisting of the 1 - isopropyl - 3 - methyl - 5 - (3',4',5' - trimethoxybenz- amido)-pyrazolo[3,4-b]pyridine and a therapeutically acceptable acid addition salt thereof.

17. A compound as claimed in claim 1, said compound being a member selected from the group consisting of the 1 - (secondary butyl) - 3 - methyl - 5 - isonicotinoylamino- pyrazolo[3,4-b]pyridine and a therapeutically acceptable acid addition salt thereof.

18. A compound as claimed in claim 1, said compound being a member selected from the group consisting of the 1 - isopropyl - 3 - methyl - 5 - thiocarbamoylamino- pyrazolo[3,4-b]pyridine and a therapeutically acceptable acid addition salt thereof.

References Cited
UNITED STATES PATENTS

| | | | |
|---|---|---|---|
| 3,365,459 | 1/1968 | Blatter | 260—296 |
| 3,423,414 | 1/1969 | Blatter | 260—296 |

ALAN L. ROTMAN, Primary Examiner

U.S. Cl. X.R.

260—247.1, 247.2, 247.5, 295.5, 296; 424—266, 248